US011102354B2

(12) United States Patent
Bender et al.

(10) Patent No.: US 11,102,354 B2
(45) Date of Patent: *Aug. 24, 2021

(54) HAPTIC FEEDBACK DURING PHONE CALLS

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Minh Q. Pham, Austin, TX (US); Kim A. Eckert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,389

(22) Filed: Mar. 24, 2020

(65) Prior Publication Data
US 2020/0220976 A1    Jul. 9, 2020

Related U.S. Application Data

(63) Continuation of application No. 16/196,875, filed on Nov. 20, 2018, now Pat. No. 10,659,614.

(51) Int. Cl.
*H04M 3/42*      (2006.01)
*H04M 3/56*      (2006.01)
(Continued)

(52) U.S. Cl.
CPC ............ *H04M 3/563* (2013.01); *G06F 3/016* (2013.01); *H04M 1/72412* (2021.01); *H04M 1/72454* (2021.01); *H04M 3/569* (2013.01)

(58) Field of Classification Search
CPC ............................. H04M 3/563; G06F 3/016
(Continued)

(56) References Cited

U.S. PATENT DOCUMENTS 8,649,494 B2    2/2014  Basson et al.
9,215,543 B2   12/2015  Sun et al.
(Continued)

OTHER PUBLICATIONS

List of IBM Patents or Patent Applications Treated as Related dated Mar. 24, 2020, 2 pages.

*Primary Examiner* — William J Deane, Jr.
(74) *Attorney, Agent, or Firm* — Tutunjian & Bitetto, P.C.; Michael A. Petrocelli

(57) ABSTRACT

A method for providing haptic feedback to participants of multi-party phone conversations that includes opening a communications session with a conference system for at least two users each having user specific communications devices, user specific conduct measuring devices, and user specific haptic feedback device registered with the conference system. Analyzing content of the communications session from content received by the conference system through the user specific communications device for at least one of the users; and capturing status for said at least two users from data measured by the user specific conduct measuring device for the at least two users. Determining with the conference system if the content of the communications session and the status of said at least two users calls for input by the user through said user specific communications device. Sending a feedback signal from the conference system to the user specific haptic feedback device.

20 Claims, 9 Drawing Sheets

(51) Int. Cl.
*G06F 3/01* (2006.01)
*H04M 1/72412* (2021.01)
*H04M 1/72454* (2021.01)

(58) Field of Classification Search
USPC .............................. 379/201.01, 158, 202.01
See application file for complete search history.

(56) References Cited

U.S. PATENT DOCUMENTS

| | | |
|---|---|---|
| 9,560,208 B2 | 1/2017 | Krack et al. |
| 9,880,623 B2* | 1/2018 | Lacroix ................... G06F 3/016 |
| 2012/0229624 A1* | 9/2012 | Caiman ............... G06F 19/3475 |
| | | 348/135 |
| 2013/0040600 A1* | 2/2013 | Reitnour ................. G01S 19/17 |
| | | 455/404.2 |
| 2016/0192166 A1* | 6/2016 | deCharms ............... H04L 67/18 |
| | | 348/14.02 |
| 2018/0048767 A1 | 2/2018 | Tinsman |

* cited by examiner

HAPTIC FEEDBACK DURING PHONE CALLS

BACKGROUND

Technical Field

The present invention generally relates to communications, and more particularly to managing feedback on multi-party phone calls.

Description of the Related Art

Historically, many meetings were face to face. Currently, there are numerous techniques for conducting meetings, in a business setting or otherwise. Many business meetings have participants that are on "phone" calls or 'conference calls', using traditional phones, cellular phones and/or voice over internet protocol (VOIP) using a computer device. During the calls, the people frequently put themselves on mute or multi-task, which can lead to others not hearing what they are saying, or conversation existing that require them to refocus, yet they are not being attentive.

SUMMARY

In accordance with an embodiment of the present invention, a method of providing feedback to participants of multi-party phone conversations is provided. In one embodiment, the method may be a computer implemented method for providing haptic feedback to participants of multi-party phone conversations that includes opening a communications session with a conference system for at least two users, wherein each of the at least two users has a user specific communications device registered with the conference system, a user specific conduct measuring device registered with the conference system, and a user specific haptic feedback device registered with the conference system. Analyzing content of the communications session from content received by the conference system through the user specific communications device for at least one of the users; and capturing status for said at least two users from data measured by the user specific conduct measuring device for the at least two users. The method may further include determining with the conference system if the content of the communications session and the status of said at least two users calls for input by the user through said user specific communications device. A feedback signal is sent from the conference system to the user specific haptic feedback device of the user that the conference system has determined that the communications session has called for said input. The user specific haptic feedback device deliverers the feedback signal to the user.

In another aspect, a system is provided for providing feedback to participants of multi-party phone conversations. In one embodiment, the system may include a registration database that includes a plurality of user accounts including addresses for user specific communications device registered with the conference system, a user specific conduct measuring devices, and a user specific haptic feedback device. A content input recorder for receiving communications content from a communications session from content received through the user specific communications device for at least one of the users. A conduct input recorder for recording a capturing status for said at least two users from data measured by the user specific conduct measuring device. An individual status calculator including at least one hardware device processor for performing a set of instruction stored on at least one memory device, the individual status calculator analyzing the content of the communications session received from the user specific communications device from at least one users, analyzing the status of said at least two users measured by the user specific conduct measuring device signals, and calculating that an individual status of one of said at least two users calls for input through said user specific communications device by said user having the individual status calling for said input. The system may further include a feedback signal to user specific haptic feedback device transmitter that sends a signal for input through said user specific communications device to a user having the individual status calling for said input. The user specific haptic feedback device delivering the feedback signal to the user having the individual status calling for said input.

In another aspect, the present disclosure provides a computer program product comprising a non-transitory computer readable storage medium having computer readable program code embodied therein for providing feedback to participants of multi-party phone conversations. The method actuated by the computer program product may include providing haptic feedback to participants of multi-party phone conversations that includes opening a communications session with a conference system for at least two users, wherein each of the at least two users has a user specific communications device registered with the conference system, a user specific conduct measuring device registered with the conference system, and a user specific haptic feedback device registered with the conference system. Analyzing content of the communications session from content received by the conference system through the user specific communications device for at least one of the users; and capturing status for said at least two users from data measured by the user specific conduct measuring device for the at least two users. The method may further include determining with the conference system if the content of the communications session and the status of said at least two users calls for input by the user through said user specific communications device. A feedback signal is sent from the conference system to the user specific haptic feedback device of the user that the conference system has determined that the communications session has called for said input. The user specific haptic feedback device deliverers the feedback signal to the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the disclosure provides methods, systems and computer program products that provide a configurable haptic feedback to individuals engaged in a call, e.g., telephone call. The term "haptic" denotes communications that create the sense of touch by applying forces, vibrations, or motions to the user. In one example, the feedback is activated when a person is talking for the meeting purpose, but has accidentally set his voice call device on mute, and no one can here the intended message. In this instance, a haptic device that is in communication with the person who has accidentally set his voice call device on mute, is used to signal to that person speaking that his voice call device is on mute, and that no one can here the intended message. In another example, the feedback is activated when a person is not talking for the meeting purpose, yet all the other parties to the conversation are hearing this non-relevant information, because he has not muted his voice call device. In this instance, a haptic device that is in communication with the person who does not realize his voice call device on mute, is used to signal to that person that non-relevant information is being transmitted to the multi-party communication over his voice call device. Once receiving the haptic signal, the person can mute his or her voice call device. In yet another example, the haptic device is used to alert a person on a multi-party communication that the subject of the communication is intended for them. The systems, methods and computer program products are now described with more detail with reference to FIGS. 1-9.

Figure 1:
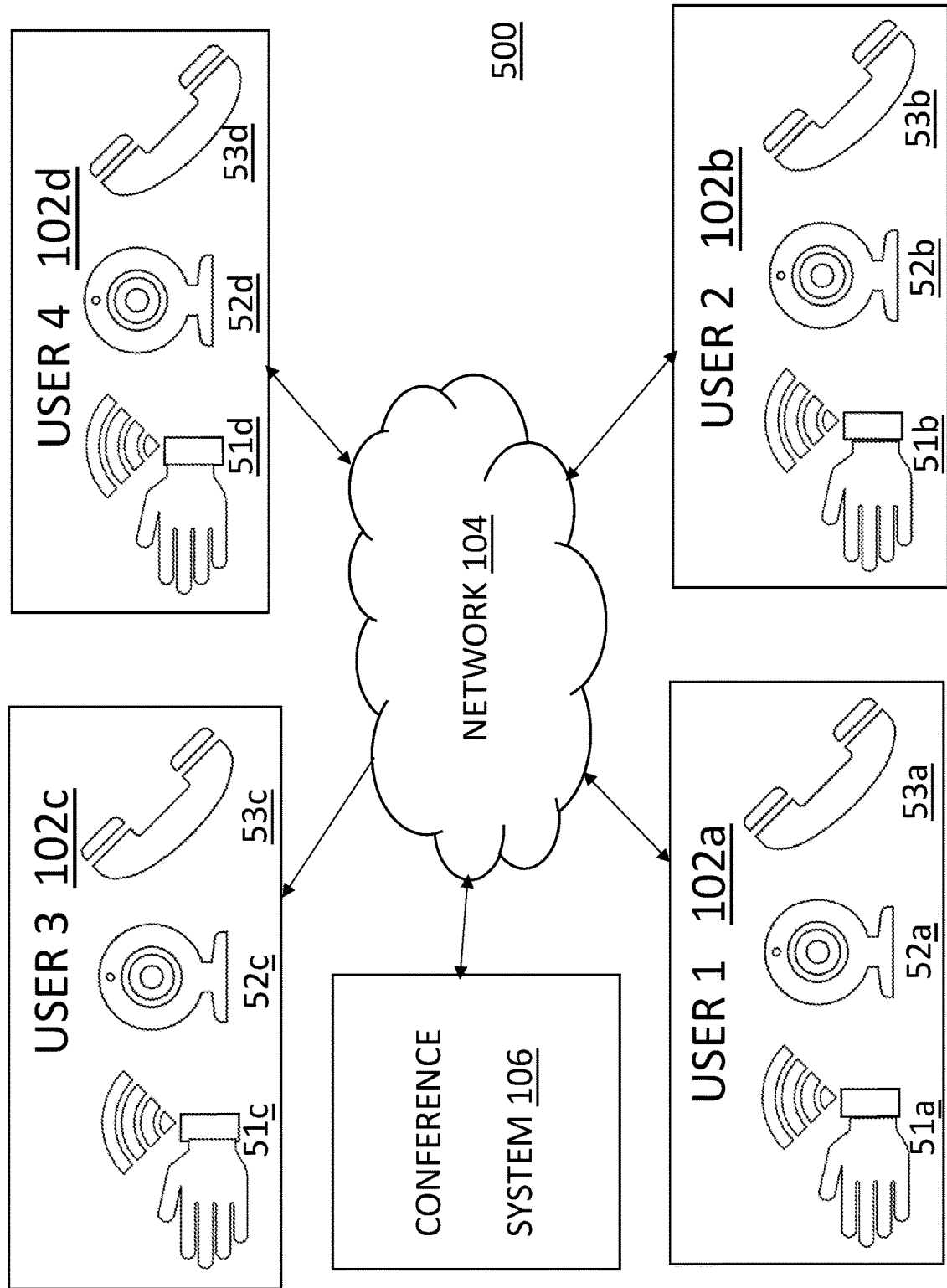
FIG. 1 is a diagram illustrating an example environment for providing feedback to participants of multi-party phone conversations of their individual status in the conversation, in accordance with one embodiment of the present disclosure.

FIG. 1 is a diagram illustrating an example environment for providing feedback to participants of multi-party phone conversations of their individual status in the conversation. The example environment includes a network 104 over which users, i.e., 102a, 102b, 102c, 102d, can communication via a multi-party communication session, through which a conference system 106 can provide feedback to participants of multi-party phone conversations of their individual status in the conversation. In example embodiments, a user, e.g., user 102a, 102b, 102c, 102d, participates on a call with one or more other users via a communication device 102 that is communicatively coupled via the network 104 to the conference system 106. Each user 102a, 102b, 102c, 102d may include a communication device 53a, 53b, 53c, 53d through which they can listen to the conversation and participate with the conversation. Each user 102a, 102b, 102c, 102d may include an IOT device, in which the IOT device 52a, 52b, 52c, 52d has the ability to measure the users conduct in determining whether their attention is directed to the multi-party conversation, or whether their attention is not directed to the multi-party conversation. The IOT devices 52a, 52b, 52c, 52d are in communication with the conference system 106 through the network. Each user 102a, 102b, 102c, 102d may also include a haptic feedback device 51a, 51b, 51c, 51d. The haptic feedback device 51a, 51b, 51c, 51d is also in communication with the conference system 106 via the network 104. The haptic feedback device 51a, 51b, 51c, 51d is the device that alerts the users 102a, 102b, 102c, 102d, if their individual status in the conversation has changed that would warrant a change in their attention to the multi-party phone conversation.

The communication device 53a, 53b, 53c, 54d may comprise, but is not limited to, a phone, a wearable phone, a smartphone, tablet, laptop, multi-processor system, microprocessor-based or programmable consumer electronics, game console, set-top box, or any other device that the user may utilize to communicate over the network 104. In some embodiments, the communication device 53a, 53b, 53c, 54d may comprise a display module (not shown) to display information (e.g., in the form of user interfaces). In further embodiments, the communication device 53a, 53b, 53c, 54d may comprise one or more of a touch screen, camera, keyboard, and microphone. During a communication session, the communication device 53a, 53b, 53c, 54d may be muted and a mute detection analysis performed.

The Internet of things (IoT) is the network of physical devices, vehicles, home appliances, and other items embedded with electronics, software, sensors, actuators, and connectivity which enables these things to connect, collect and exchange data. The IoT devices 52a, 52b, 52c, 52d can be equipped with various types of sensors to collect information about themselves and their surroundings, and provide the collected information to the conference system 106 over the network 104.

In some examples, the IOT devices 52a, 52b, 52c, 52d or a hub that the IOT devices 52a, 52b, 52c, 52d are in communication with include a cellular radio to establish a connection to the Internet via a cellular service such as a 4G (e.g., Mobile WiMAX, LTE) or 5G cellular data service. Alternatively, or in addition, the IOT devices or a hub that the IOT devices are in communication with include a may include a WiFi radio to establish a WiFi connection through a WiFi access point or router which couples the IOT devices 52a, 52b, 52c, 52d or IOT hub to the Internet (e.g., via an Internet Service Provider providing Internet service to the end user), which in turn connect to the conference system 106/network 104. Of course, it should be noted that the underlying principles of the invention are not limited to any particular type of communication channel or protocol.

In one embodiment, the IoT devices 52a, 52b, 52c, 52d are ultra low-power devices capable of operating for extended periods of time on battery power (e.g., years). To conserve power, the local communication channels may be implemented using a low-power wireless communication technology such as Bluetooth Low Energy (LE). In this embodiment, each of the IoT devices 52a, 52b, 52c, 52d are equipped with Bluetooth LE radios and protocol stacks.

In one embodiment, the IoT platform includes an IoT app or Web application executed on user devices 102a, 102b, 102c, 102d to allow users to access and configure the connected IoT devices 52a, 52b, 52c, 52d, an IoT hub, and/or IoT service. The Web application may provide for communication over the network 104 to the conference system 106.

One form of internet of things (IOT) that is suitable for use as the connected IoT devices 52a, 52b, 52c, 52d to the network 104 includes a microphone for measuring sounds, such as voices. These may be virtual assistant type devices. Examples of these types of devices may include Cortana™ by Microsoft, Apple Siri™, Google Assistant, Amazon Alexa™, and Samsung Bixby™. The Alexa virtual assistant type devices by Amazon are supported by a number of hardware factors, such as speakers (smart speakers), e.g., Amazon Echo™, Amazon Echo Plus™, Amazon Echo Dot™; televisions and media boxes; phones and tablet computers; laptop and desktop computers; smart home devices, such as lamps, light switches, thermostats, smoke alarms etc.; wearable and earphones and computer program products. The Cortana™ virtual assistant provided by Microsoft can be provided by computer operating systems such as Windows 10™, Windows 10 Mobile™ Windows Phone™, iOS™, Android™, etc. The Cortana™ virtual assistance provided by Microsoft may also be available in a number of hardware form factors, such as smart speakers, headphones, video game systems, e.g., Xbox One™, etc.

In some examples, the combination of the IoT devices 52a, 52b, 52c, 52d, having a microphone for receiving user communications, i.e., for working with the conference system 106, can include a system that has a universal vocabulary, or basic machine-to-machine language capabilities, that can allow IoT devices 52a, 52b, 52c, 52d to communicate with the conference system 106, for providing communications by the users to be analyzed for their relevance to the subject of the multi-party conversation. For example, the vocabulary measured by the IoT devices 52a, 52b, 52c, 52d can be in plain English phrases or through some other form of abstraction. The vocabulary can be scalable such that new additions can be added to the vocabulary, e.g. for more complex actions. In one example, the vocabulary may be, or may include, an STN model for IoT devices.

The IOT devices 52a, 52b, 52c, 52d may also include a video camera for recording the motions of the users 102a, 102b, 102c, 102d. This video information can be used to determine if the user 102a, 102b, 102c, 102d is engaged in an activity/exercise/event that would be taking his attention away from the multi-party conversation. The IOT devices 52a, 52b, 52c, 52d may be the same devices, or different devices from the IOT devices 52a, 52b, 52c, 52d including the microphone for capturing sound and/or speech from the users 102a, 102b, 102c, 102d. For example, the IOT devices 52a, 52b, 52c, 52d that include a video camera may be a computer-based hardware device that includes a processor, memory, and communication capabilities. Each of the IOT devices including the camera 52a, 52b, 52c, 52d may be coupled to the network 104 to communicate data between the one or more of the 102a, 102b, 102c, 102d, and the conference system 106.

Some examples of the IOT devices 52a, 52b, 52c, 52d that can include a video camera for include a personal computer, a computer monitor, a phone, a laptop, a tablet computer, a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, a mobile device, an automotive sensor, a cooking device, an electrical breaker, a personal alert sensor, a motion sensor, a calendar, a television, a radio, a radio frequency identification (RFID) tag/ RFID detector, a vehicle, an electric vehicle charger, a distributed generator (e.g. solar panel), a distributed energy storage (e.g. battery), a thermometer, and combinations thereof.

The type of camera employed in the IOT devices 52a, 52b, 52c, 52d may be any camera that can determine whether the user's attention is on the multi-party conversation. For example, if the user is engaged in conversation in a person in his office while the multi-party phone conversation is pending, the IOT devices 52a, 52b, 52c, 52d can record that activity and forward the information over the network 104 to the conference system 106. The conference system 106 can then analyze the video and determine if an alert need to be sent to the user 102a, 102b, 102c, 102d to indicate to the user that the user's attention should be on the multi-party conversation based upon the user's individual status in the conversation.

The haptic feedback device 51a, 51b, 51c, 51d in one embodiment includes an actuator, such as, e.g., an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA"), a high bandwidth actuator, an electroactive polymer ("EAP") actuator, an electrostatic friction display, or an ultrasonic vibration generator. In addition to an actuator, the haptic feedback device 51a, 51b, 51c, 51d may be a non-mechanical or non-vibratory device such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc. Multiple haptic output devices with multiple haptic effects can generate a haptic effect.

The generated haptic effects can include a wide range of effects and technologies, including vibrations, deformation, squeezing, poking, stretching, surface friction, heat, etc. A device that generates haptic effects, and includes haptic feedback device 51a, 51b, 51c, 51d, can be a wearable device (e.g., a bracelet, armband, glove, jacket, vest, pair of glasses, shoes, belt, etc.), a handheld device (e.g., a mobile phone, computer mouse, etc.), haptically enabled furniture (e.g., a chair, couch, etc.) or any other haptically enabled device. In one example, the haptic feedback device 51a, 51b, 51c, 51d is a smartwatch. In another example, the haptic feedback device 51a, 51b, 51c, 51d is a Fitbit™ activity tracker available from Fitbit Inc.

The haptic feedback device 51a, 51b, 51c, 51d can include cellular radio to establish a connection to the Internet via a cellular service such as a 4G (e.g., Mobile WiMAX, LTE) or 5G cellular data service to access the network 104; or the haptic feedback device 51a, 51b, 51c, 51d may include a WiFi radio to establish a WiFi connection through a WiFi access point or router which couples the haptic feedback device 51a, 51b, 51c, 51d to the Internet (e.g., via an Internet Service Provider providing Internet service to the end user), which in turn connect to the conference system 106/network 104. Of course, it should be noted that the underlying principles of the invention are not limited to any particular type of communication channel or protocol. For example, in one embodiment, the haptic feedback device 51a, 51b, 51c, 51d may be equipped with Bluetooth LE radios and protocol stacks.

As noted above, the conference system 106 determining that a user 102a, 102b, 102c, 102d is not directing his attention to the multi-party conversation, or a user 102*a*, 102*b*, 102*c*, 102*d* that is attempting to contribute to the multi-party conversation yet cannot because the user 102*a*, 102*b*, 102*c*, 102*d* has set his communication device 53*a*, 53*b*, 53*c*, 53*d* to mute; the conference system 106 can send a signal to the user 102*a*, 102*b*, 102*c*, 102*d* via the haptic feedback device 51*a*, 51*b*, 51*c*, 51*d* that he should pay attention to the multi party conversation and/or un-mute his communication device 53*a*, 53*b*, 53*c*, 53*d*.

One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 104 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The conference system 106 manages a communication session (also referred to as a "conference call" or "call") between the users 102*a*, 102*b*, 102*c*, 102*d*. While a total of four users or participants are shown in the conference call illustrated in FIG. 1, any number of users may be involved in the conference call. The conference system 106 provides for recording the data provided by the communication devices 53*a*, 53*b*, 53*c*, 53*d*, and recording the data collected by the IOT devices 52*a*, 52*b*, 52*c*, 52*d*. The conference system 106 analyzes the data, and determines if the content of the communications session and the status of said at least two users calls for input by the user through said user specific communications device.

Thereafter, the conference system 106 sends a feedback signal to the user specific haptic feedback device 51*a*, 51*b*, 51*c*, 51*d* of the user that the conference system 106 has determined that the communications session has called for the input by the user.

It is noted that the environment 500 shown in FIG. 1 is merely an example. For instance, not all components of the environment 500 may be shown. Additionally, any two or more of the systems, devices, or machines illustrated in FIG. 1 may be combined into a single system, device, or machine, and the functions described herein for any single system or machine may be subdivided among multiple systems or machines.

Any of the systems or machines (e.g., devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIGS. 2 and 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
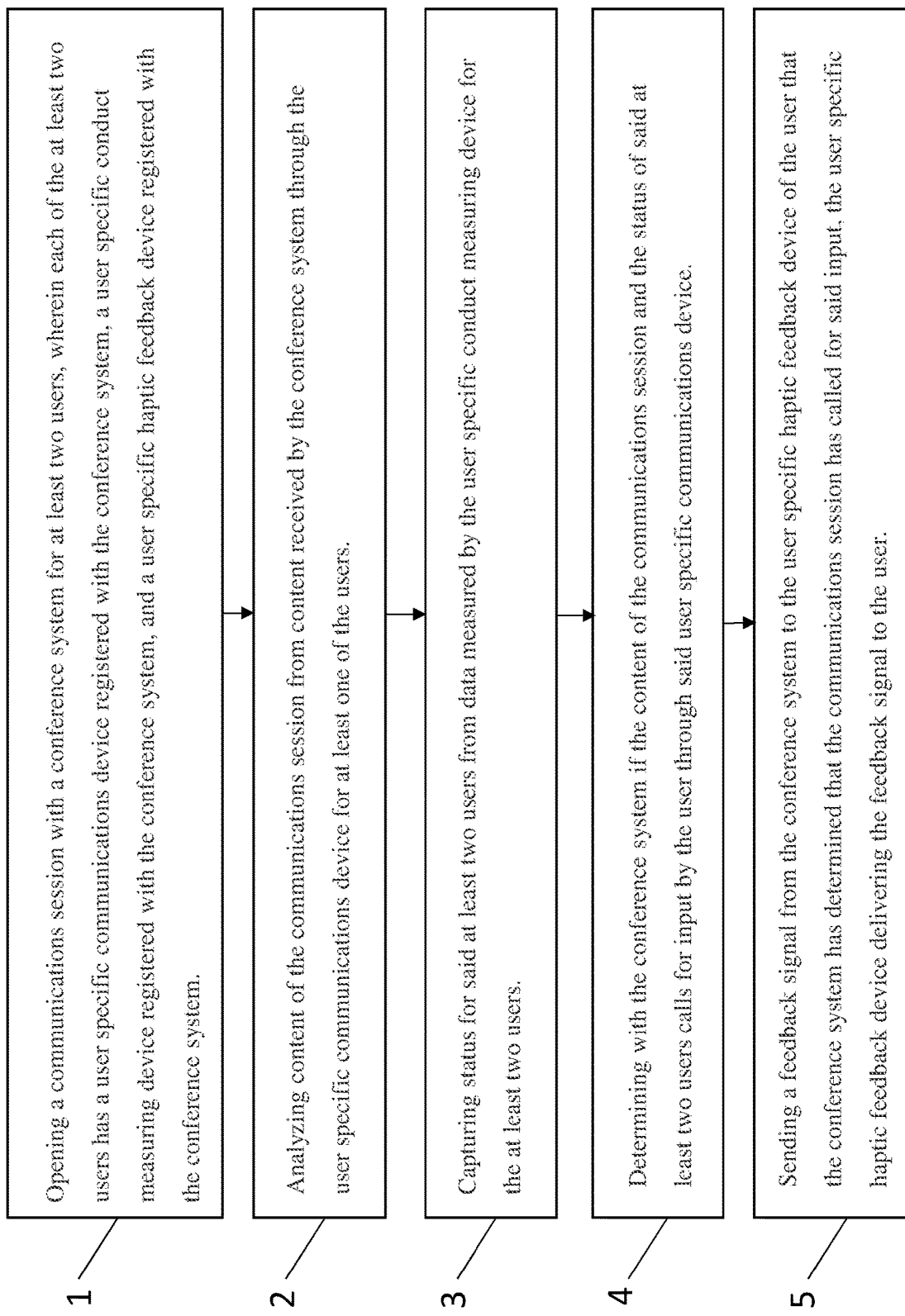
FIG. 2 is a block/flow diagram showing a method of providing feedback to participants of multi-party phone conversations of their individual status in the conversation, in accordance with an embodiment of the present invention.

FIG. 2 is a block/flow diagram showing a method of providing feedback to participants of multi-party phone conversations of their individual status in the conversation.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include opening a communications session with a conference system 106 for at least two users (102*a*, 102*b*, 102*c*, 102*d*), wherein each of the at least two users has a user specific communications device 53*a*, 53*b*, 53*c*, 54*d* registered with the conference system, a user specific conduct measuring device, e.g., user specific IOT device 52*a*, 52*b*, 52*c*, 52*d*, registered with the conference system, and a user specific haptic feedback device 51*a*, 51*b*, 51*c*, 51*d* registered with the conference system. Registration means that addresses are provided to the conference system 106 so that all the devices may be reached over the network 104. Registration for the user specific communications device 53*a*, 53*b*, 53*c*, 54*d* may include the entry of phone numbers by the users into the conference system 106. This information may be stored in a registration database 20 that includes a plurality of user accounts, e.g., user specific communications device database 21 (database of addresses for the user specific communications device 53*a*, 53*b*, 53*c*, 54*d*), user specific conduct measuring device database 22 (database of addresses for the user specific IOT devices 52*a*, 52*b*, 52*c*, 52*d*), and a user specific haptic feedback device database 23 (database of addresses for the user specific haptic feedback device 51*a*, 51*b*, 51*c*, 51*d*). Each of these databases can include a form of hardware memory for storing address data.

It is noted that the term "user specific" is meant to denote that each user has their own communications device having an address that is unique to the user, each user has their own conduct measuring device having an address that is unique to the user, and each user has their own haptic feedback device having an address that is unique to the user.

Opening a communications session may involve one of the users 102*a*, 102*b*, 102*c*, 102*d* functioning as a "host" to set up a communications session with the conference system 100. This can include logging into the conference system 100 by providing identification that can identify each of the users.

The conference system 100 can provide a conference time and conference log in information, which can be distributed to all the users 102a, 102b, 102c, 102d. It is not necessary that all users 102a, 102b, 102c, 102d have conference time reserved for the communications session before the communications session begins. For example, a user 102a, 102b, 102c, 102d can call into the communications session after it has started and add all the required address information, e.g., addresses for the user specific communications device 53a, 53b, 53c, 54d, addresses for the user specific IOT devices 52a, 52b, 52c, 52d (also referred to as specific conduct measuring devices), and addresses for the user specific haptic feedback device 51a, 51b, 51c, 51d), with the conference system 100 to participate in the communications session. In other examples, a user may already have all their information saved by the conference system 100 from a prior interaction, and the call into the system may automatically interconnect all of the user specific devices with the call.

In some embodiments, the user specific communications device 53a, 53b, 53c, 54d is a telephone with a mute function. By "mute function" it is meant, that the communications device, e.g., telephone, may have the ability to selective disable the voice receiving function, e.g., microphone, so that any sound directed at the telephone is not transmitted into a conversation, communication and/or conference being conducted over a network of communication devices, such as other telephones. It is noted that the mute function is reversible. For example, when the mute function is "ON", sound directed at that device is not transmitted, however when the mute function is "OFF", sound directed at the device, e.g., telephone device, is transmitted into the conversation, communication and/or conference being conducted over the network of communication devices, such as other telephones.

In some examples, the user specific conduct measuring device is an internet of things (IOT) device 52a, 52b, 52c, 52d including at least one of a camera and a microphone. In one example, the user specific conduct measuring device is a voice assistant, which can listen to the users statements being made during the time of the communications session. The voice assistance may also have video capabilities for determining the physical behavior of the user 102a, 102b, 102c, 102d during the time of the communications session. The user specific conductive measuring device may be provided by more than one device. For example, recording of audio data from the users 102a, 102b, 102c, 102d can be achieved using a voice assistance, while recording of video data can be provided by IOT type security cameras, etc. In yet another example, the microphone and video components that are built into a PC computer, e.g., the monitor of the PC computer, can also provide the audio and video components for the user specific conduct measuring device. This is particularly useful for an office or cubicle type setting.

The user specific haptic feedback device 51a, 51b, 51c, 51d asserts a signal by physical interaction with the user by an electric motor, an electro-magnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof. In one embodiment, the specific haptic feedback device 51a, 51b, 51c, 51d has a form factor to be worn on a wrist of the user.

It is also noted that embodiments have been contemplated in which the user specific IOT devices 52a, 52b, 52c, 52d (also referred to as specific conduct measuring devices) are not provided by the users themselves, but happen to in an area, in which the users are present during the time of the communications session 100. In this example, the conference system 100 may be able to match user specific IOT devices 52a, 52b, 52c, 52d with users 102a, 102b, 102c, 102d by the users providing their location, or employing GPS access to determine the presence of IOT devices for determining the conduct of the users.

Referring to FIG. 2, at block 2, the method can continue with analyzing content of the communications session from content received by the conference system 100 through the user specific communications device 53a, 53b, 53c, 53d for at least one of the users. Analyzing the content of the communications session may include recording the content of the multi-party discussion that results from at least one or two of the multiple users 102a, 102b, 102c, 102d speaking into their own specific communications device 53a, 53b, 53c, 53d. The recording and storage of that information may be provided by the content input recorder 25 of the conference system 100 depicted in FIG. 3. The content input recorder 25 may include any type of memory and/or media capable of recording voice transmissions.

In some embodiments, the analyzing of the content of the communications session from the content received by the conference system 100 through the user specific communications device 53a, 53b, 53c, 53d for the at least one of the users 102a, 102b, 102c, 102d can include capturing a phone conversation for all participants from the user specific communication device 53a, 53b, 53c, 53d; and measuring a volume for the participants from the user specific communication device. In some instances, measuring of the volume includes determining for the participants whether user specific communication device 53a, 53b, 53c, 53d for at least one of the users is on mute. The analysis can include determining the content of the conversation by different subjects. The analysis can further include a feature for determining when a specific user, e.g., by user name, is being called for information in the communications session.

Referring to FIG. 2, at block 3, the method can continue with capturing status for said at least two users 102a, 102b, 102c, 102d from data measured by the user specific conduct measuring device, e.g., internet of things (IOT) device 52a, 52b, 52c, 52d, including at least one of a camera and a microphone, for the at least two users. In some embodiments, capturing status for said at least two users from data measured by the user specific conduct measuring device for the at least two users includes determining with the camera of the user specific conduct measuring device 53a, 53b, 53c, 53d a direction of the users 102a, 102b, 102c, 102d while talking with respect to the user specific communication device 53a, 53b, 53c, 53d. Determining the direction of a user 102a, 102b, 102c, 102d can be used to determine whether a user 102a, 102b, 102c, 102d is paying attention to the content of the communications session, or whether a user 102a, 102b, 102c, 102d is not paying attention to the content of the communications session. For example, if the user 102a, 102b, 102c, 102d is facing the user specific communication device 53a, 53b, 53c, 53d, which may be a telephone or a computer including a microphone, it can be assumed that the user 102a, 102b, 102c, 102d is an active participant in the communications session, i.e., the user 102*a*, 102*b*, 102*c*, 102*d* is paying attention. For example, if the user 102*a*, 102*b*, 102*c*, 102*d* is facing away from the user specific communication device 53*a*, 53*b*, 53*c*, 53*d*, which may be a telephone or a computer including a microphone, it can be assumed that the user 102*a*, 102*b*, 102*c*, 102*d* is not an active participant in the communications session, i.e., the user 102*a*, 102*b*, 102*c*, 102*d* is not paying attention. The direction of the users 102*a*, 102*b*, 102*c*, 102*d* can be measured using a video camera, e.g., the video camera of the user specific conduct measuring device, e.g., internet of things (IOT) device 52*a*, 52*b*, 52*c*, 52*d*.

In another example, determining a distance of users 102*a*, 102*b*, 102*c*, 102*d* while talking with respect to the user specific communication device 53*a*, 53*b*, 53*c*, 53*d* can be used to determine whether a user 102*a*, 102*b*, 102*c*, 102*d* is paying attention to the content of the communications session, or whether a user 102*a*, 102*b*, 102*c*, 102*d* is not paying attention to the content of the communications session. For example, if the user 102*a*, 102*b*, 102*c*, 102*d* is within arm's length of the user specific communication device 53*a*, 53*b*, 53*c*, 53*d*, which may be a telephone or a computer including a microphone, it can be assumed that the user 102*a*, 102*b*, 102*c*, 102*d* is an active participant in the communications session, i.e., the user 102*a*, 102*b*, 102*c*, 102*d* is paying attention. For example, if the user 102*a*, 102*b*, 102*c*, 102*d* is far away from the user specific communication device 53*a*, 53*b*, 53*c*, 53*d*, which may be a telephone or a computer including a microphone, which can mean more than arm's length from the user specific communication device 53*a*, 53*b*, 53*c*, 53*d*, it can be assumed that the user 102*a*, 102*b*, 102*c*, 102*d* is not an active participant in the communications session, i.e., the user 102*a*, 102*b*, 102*c*, 102*d* is not paying attention. The distance of the users 102*a*, 102*b*, 102*c*, 102*d* from the user specific communication device 53*a*, 53*b*, 53*c*, 53*d* can be measured using a video camera, e.g., the video camera of the user specific conduct measuring device, e.g., internet of things (IOT) device 52*a*, 52*b*, 52*c*, 52*d*.

In yet another example, determining whether a user 102*a*, 102*b*, 102*c*, 102*d* is speaking with another party directly while the multi-party phone conversation is pending can be used to determine whether a user 102*a*, 102*b*, 102*c*, 102*d* is paying attention to the content of the communications session, or whether a user 102*a*, 102*b*, 102*c*, 102*d* is not paying attention to the content of the communications session. For example, if the user 102*a*, 102*b*, 102*c*, 102*d* is not speaking with a third party that is not a party to the multi-party conversation of the communications session it can be assumed that the user 102*a*, 102*b*, 102*c*, 102*d* is an active participant in the communications session, i.e., the user 102*a*, 102*b*, 102*c*, 102*d* is paying attention. For example, if the user 102*a*, 102*b*, 102*c*, 102*d* is speaking with a third party that is not a party to the multi-party conversation of the communications session it can be assumed that the user 102*a*, 102*b*, 102*c*, 102*d* is not an active participant in the communications session, i.e., the user 102*a*, 102*b*, 102*c*, 102*d* is not paying attention. The presence of third parties speaking to the users 102*a*, 102*b*, 102*c*, 102*d* can be detected using a video camera, e.g., the video camera of the user specific conduct measuring device, e.g., internet of things (IOT) device 52*a*, 52*b*, 52*c*, 52*d*, as well as an audio source. Facial recognition may be employed. Additionally, the conversation with a third party can be analyzed to determine is subject and applicability to the subject of the multi-party conversation of the communications session. It is not necessary that the third party be a person, or that the noise made by the third party be a voice communication. In some instances, the third party can be a pet, such as a dog or cat. In this instance, the noise collected by the user specific conduct measuring device, e.g., internet of things (IOT) device 52*a*, 52*b*, 52*c*, 52*d*, may be pet emitted sound, such as a bark or cat. The conference system 100 could flag these sounds as being inappropriate to the subject of the multi-party conversation, especially if also recorded over the user specific communication device 53*a*, 53*b*, 53*c*, 53*d* so that all users 102*a*, 102*b*, 102*c*, 102*d* can here the irrelevant noise. The irrelevant background noise does not have to be limited to pet noises. Any background noise may be analyzed. For example, third party conversations with people not party to the communications session, TV, radio, intercom announcements, building noise, as well as other background noises can be measured specific to a user, analyzed by the conference system 100, and stopped from further transmission by sending a signal from the conference system 100 to the user 102*a*, 102*b*, 102*c*, 102*d* to mute his particular communication device 53*a*, 53*b*, 53*c*, 53*d*.

Figure 3:
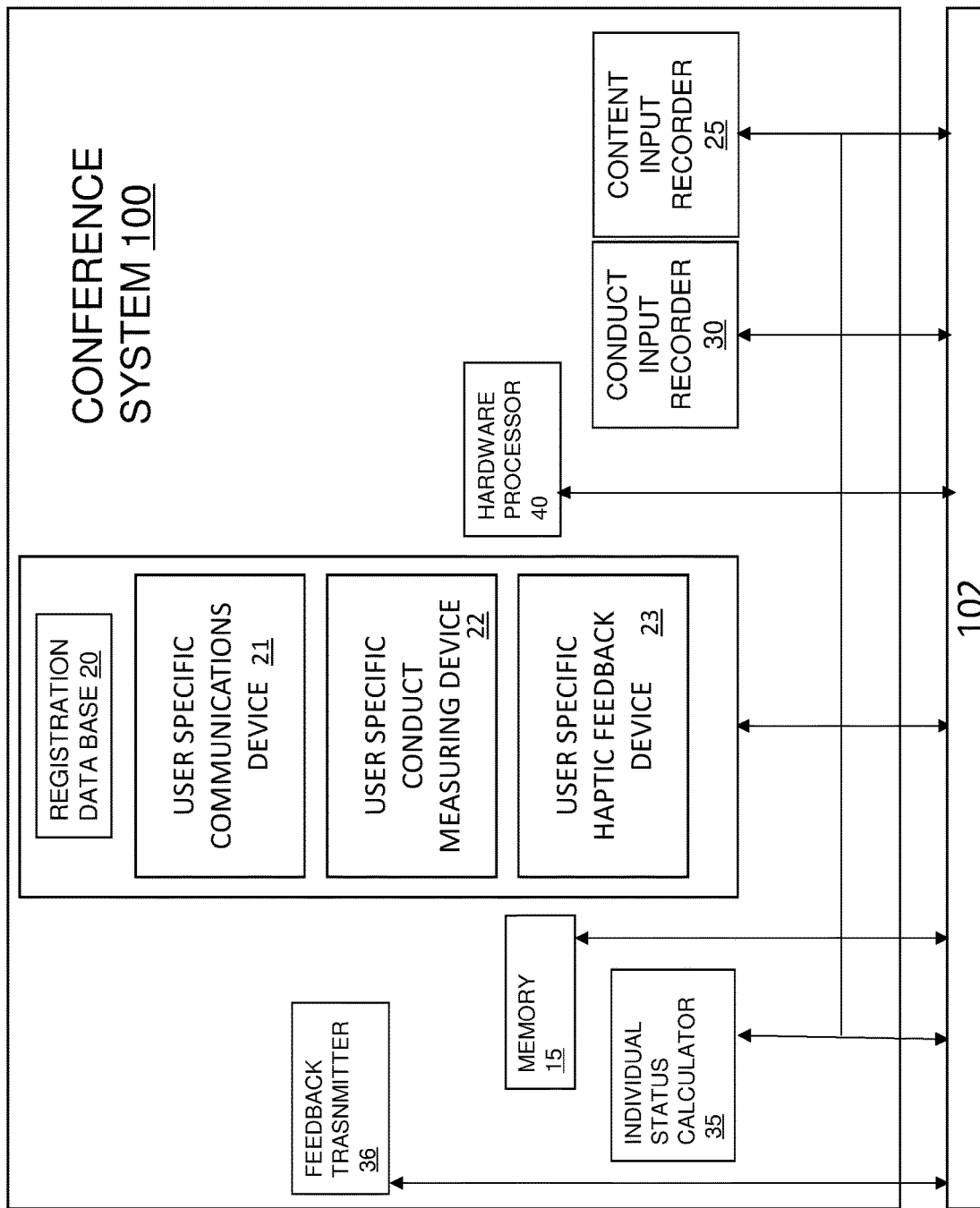
FIG. 3 is a block diagram illustrating a conferencing system for providing feedback to participants of multi-party phone conversations of their individual status in the conversation, in accordance with one embodiment of the present disclosure.

Referring to FIG. 3, the recording and storage of the conduct of users 102*a*, 102*b*, 102*c*, 102*d* measured by the user specific conduct measuring device, e.g., internet of things (IOT) device 52*a*, 52*b*, 52*c*, 52*d*, may be provided by the conduct input recorder 30 of the conference system 100 depicted in FIG. 3. The conduct input recorder 30 may include any type of memory and/or media capable of recording video and/or audio transmissions.

Referring to FIG. 2, at block 4, the method can continue with determining with the conference system 100 if the content of the communications session and the status of at least two users 102*a*, 102*b*, 102*c*, 102*d* calls for input by the user 102*a*, 102*b*, 102*c*, 102*d* through the user specific communications device 53*a*, 53*b*, 53*c*, 53*d*. An "input" by a user 102*a*, 102*b*, 102*c*, 102*d* can be that during the multi-party conversation of the communications session content is raised by at least one of the users that a second user is to address. The content could designate a party, i.e., user 102*a*, 102*b*, 102*c*, 102*d*, by name. For example, one user may specifically address or request an answer, i.e., a call for input to the conversation, from a second user, e.g., by name, or title. The content of the communications session could designate a party, i.e., user 102*a*, 102*b*, 102*c*, 102*d*, by subject of the communication, or a change in subject of the communication. For example, if the subject of the multi-party conversation of the communication session was to change from discussing transportation to a meeting to security at a meeting, the subject of the communication can change to security, and all users having security responsibility may be called for input to the conversation.

In some embodiments, determining with the conference system 100 if the content of the communications session and the status of at least two users 102*a*, 102*b*, 102*c*, 102*d* calls for input by the user through a user specific communications device 53*a*, 53*b*, 53*c*, 53*d* includes determining that the user 102*a*, 102*b*, 102*c*, 102*d* is attempting to contribute to the multi-party phone conversation by speaking into the user specific communication device 53*a*, 53*b*, 53*c*, 53*d* while it is set on mute. This can be determined at block 2 of the method, in which during that portion of the sequence conversation from the users 102*a*, 102*b*, 102*c*, 102*d* is recorded through the user specific communication device 53*a*, 53*b*, 53*c*, 53*d*, and the volume of the transmission is measured, e.g., whether the user specific communication device 53*a*, 53*b*, 53*c*, 53*d*, is on mute setting. Once a mute setting is determined, it can be further determined from the user specific conduct measuring devices, e.g., internet of things (IOT) devices 52*a*, 52*b*, 52*c*, 52*d*, whether a user is trying to introduce voice content/message to the multi-party conversation in the communication session over a user specific communication device 53a, 53b, 53c, 53d that is set on mute using the video and/or audio capabilities of the user specific conduct measuring devices, e.g., internet of things (IOT) devices 52a, 52b, 52c, 52d. If a user is trying to communicate over a phone/device set to mute, the conference system 100 calls for an input to the user to turn the mute setting of the phone/device off.

In some embodiments, determining with the conference system 100 if the content of the communications session and the status of at least two users 102a, 102b, 102c, 102d calls for input by the user 102a, 102b, 102c, 102d through user specific communications device includes determining that the communications session includes the name of an individual user, determining the individual user is not facing user specific communications device 53a, 53b, 53c, 53d with the user specific conduct measuring device, and issuing a call for input by the user 102a, 102b, 102c, 102d. In this instance, the content of the multi-party conversation has directed to a person, i.e., user, that is not paying attention to the conversation. The call for input is to get the user 102a, 102b, 102c, 102d to redirect his attention back to the conversation. Additionally, it is not required that the conversation specifically designate a user by name in this example. The multi-party conversation may designate a user 102a, 102b, 102c, 102d by a subject of the conversation, in which the subject is correlated with a specific user. Additionally, the location, e.g., distance of the user 102a, 102b, 102c, 102d, may be used a substitution or in combination with the direction of the user 102a, 102b, 102c, 102d in determining a user's degree of attention.

In another embodiment, determining with the conference system 100 if the content of the communications session and the status of at least two users calls 102a, 102b, 102c, 102d for input by the user through user specific communications device includes determining that the communications session includes background noise not relevant to the multi-party conversation being measured from the user specific communications device, determining the specific communications device is not muted; and issuing calls for input to the user corresponding to the specific communications device. If a user is trying to communicate over a phone/device set to mute, the conference system 100 calls for an input to the user to turn the mute setting of the phone/device off.

The step of determining with conference system 100 if the content of the communications session and the status of at least two users calls 102a, 102b, 102c, 102d for input by the user through user specific communications device may be provided by an individual status calculator 35 that is depicted in FIG. 3. The individual status calculator 35 can at least one hardware device processor for performing a set of instruction stored on at least one memory device, in which the individual status calculator 35 analyzes the content of the communications session received from the user specific communications device from at least two users that is recorded and stored in the content input recorder 25, analyzing the status of said at least two users measured by the user specific conduct measuring device signals recorded and stored in the conductive input recorder 30, and calculating whether an individual status for one of said at least two users calls for an input through said user specific communications device by the user having the individual status calling for the input. Calculating whether an individual status for one of said at least two users calls for an input may include cognitive analysis of inputs from the conductive input recorder 30 and the content input recorder 25 to determine state conditions, providing a weight for each condition, and compare defined actions to weighted result of all inputs. The result of the inputs illustrates when a call for an input from a user is needed.

The individual status calculator 35 may be provided by some form or artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 5:
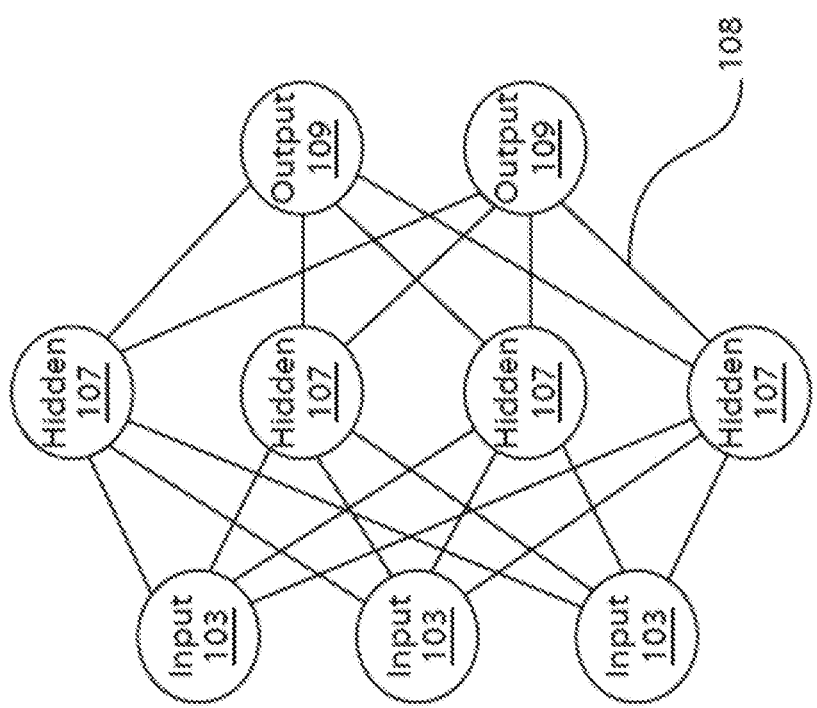
FIG. 5 is a generalized diagram of a neural network.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 103 that provide information to one or more "hidden" neurons 107. Connections between the input neurons 103 and hidden neurons 107 are weighted and these weighted inputs are then processed by the hidden neurons 107 according to some function in the hidden neurons 107, with weighted connections between the layers. There may be any number of layers of hidden neurons 107, and as well as neurons that perform different functions. There exist different neural network structures as well, such as convolutional neural network, maxout network, etc. Finally, a set of output neurons 109 accepts and processes weighted input from the last set of hidden neurons 107.

This represents a "feed-forward" computation, where information propagates from input neurons 103 to the output neurons 109. Upon completion of a feed-forward computation, the output is compared to a desired output available from training data. The error relative to the training data is then processed in "feed-back" computation, where the hidden neurons 107 and input neurons 103 receive information regarding the error propagating backward from the output neurons 109. Once the backward error propagation has been completed, weight updates are performed, with the weighted connections being updated to account for the received error. This represents just one variety of ANN. The description of the functioning of the neural network provided with reference to FIG. 5 can provide one example of how the data from collected from blocks 2 and 3 of the method depicted in FIG. 2 can provide the data for determining with the individual status calculator 35 depicted in FIG. 3 whether the content of the communications session and the status of at least two users calls for input by the user.

Figure 6:
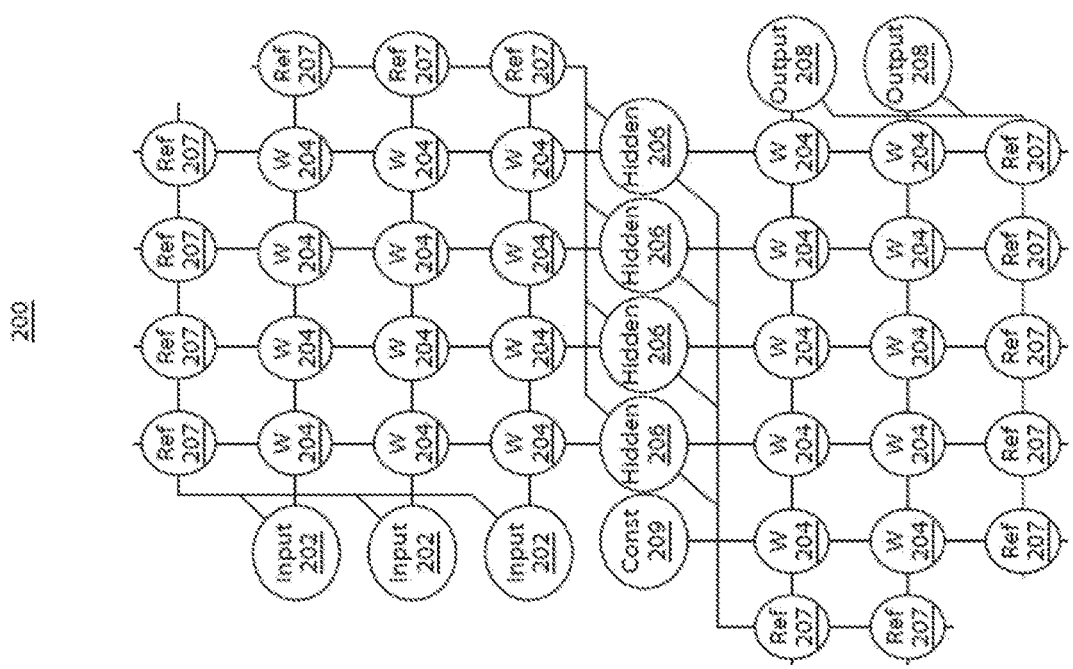
FIG. 6 illustrates an example of an artificial neural network (ANN) architecture.

FIG. 6 illustrates an example of an artificial neural network (ANN) architecture 200. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $I=V/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 7:
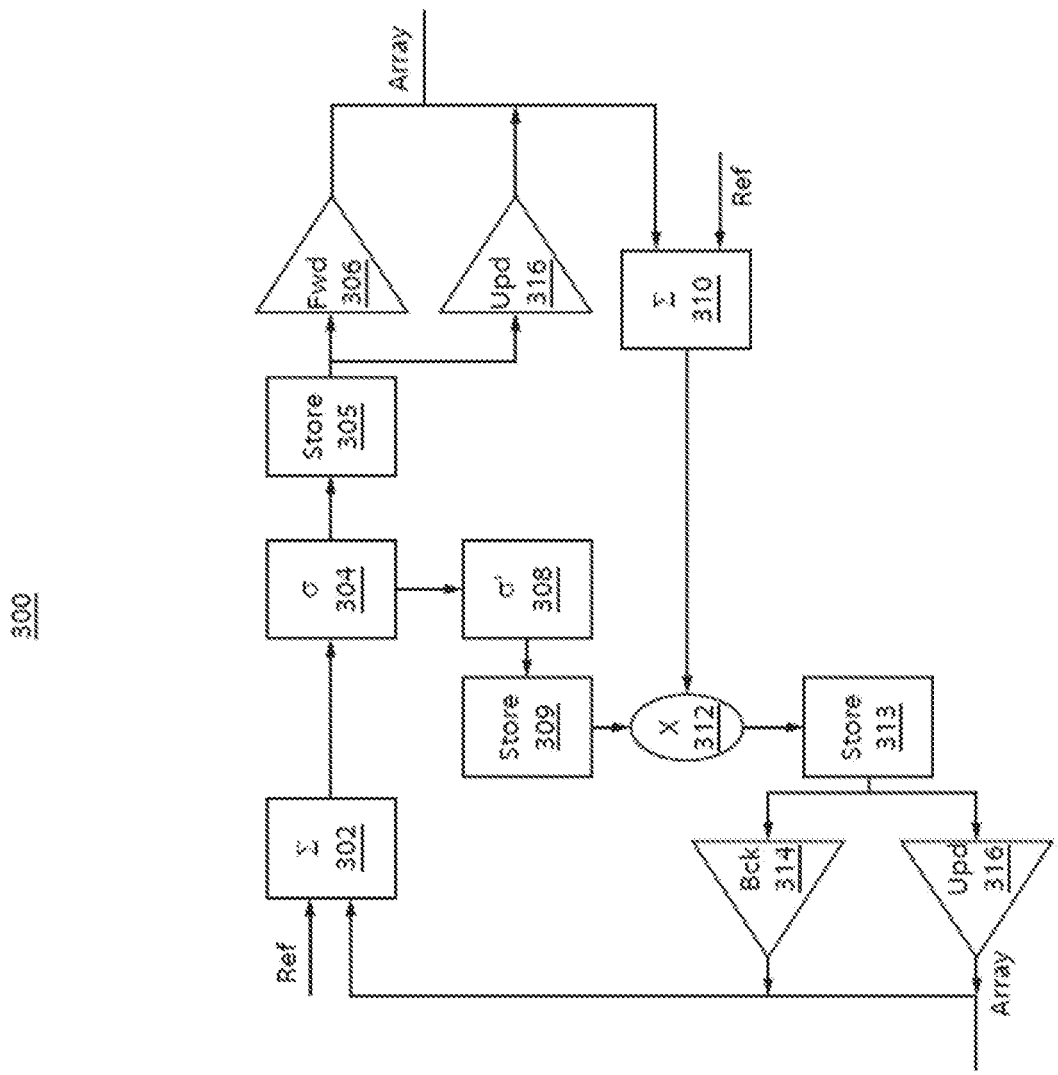
FIG. 7 is a block diagram of a neuron for use with the neural network depicted in FIG. 5 and the artificial neural network (ANN) architecture depicted in FIG. 6.

Referring now to FIG. 7, a block diagram of a neuron 300 is shown. This neuron may represent any of the input neurons 202, the hidden neurons 206, or the output neurons 208. It should be noted that FIG. 7 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In one particular embodiment, the weights 204 may be implemented in software or in hardware, for example using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

The artificial neural networks described above with reference to FIGS. 5-7 provide one mechanism of how the data from collected from blocks 2 and 3 of the method depicted in FIG. 2 can provide the data for determining with the individual status calculator 35 depicted in FIG. 3 whether the content of the communications session and the status of at least two users calls for input by the user.

Referring to FIG. 2, at block 5, the method can continue with sending a feedback signal from the conference system 100 to the user specific haptic feedback device 51a, 51b, 51c, 51d of the user 102a, 102b, 102c, 102s that the conference system has determined that the communications session has called for the input. The user specific haptic feedback device 51a, 51b, 51c, 51d then delivers the feedback signal to the user. The user is then alerted that a mute function of his communication device needs to be adjusted and/or his attention is to be redirected to the multi-person conversation of the communications session.

In one example, a user 102a, 102b, 102c, 102d is on a phone call and has placed his phone on mute. He starts to respond. The system 100 vibrates his smartwatch, i.e., haptic feedback device 51a, 51b, 51c, 51d, for a time period of 3 seconds based on his configuration. The haptic signal illustrates to the user that the mute function of his phone is to be turned off In another example, a user 102a, 102b, 102c, 102d is on a phone call and has placed his phone on mute. He starts talking to his father, i.e., third party that is not a part of the multi-party conversation of the communication across the room. Based on IoT sensors determining he is not talking towards his phone and other conversation going on, no feedback is initiated.

In yet another example, while the user 102a, 102b, 102c, 102d is on the phone call, the user's name is mentioned in the multi-person conversation. The system determines the user is not engaged in the conversation. The system 100 pulses that users fitbit, i.e., haptic feedback device 51a, 51b, 51c, 51d, for a period of 3 times. The user is alerted that her attention is needed for the conversation.

In a further example, while the user 102a, 102b, 102c, 102d is on the phone call, the user's name is mentioned in the multi-person conversation. The system determines the user is engaged in the conversation. The system does not send a signal to the user's haptic feedback device 51a, 51b, 51c, 51d.

In an even further example, while the user 102a, 102b, 102c, 102d is on the phone call, the user's name is mentioned in the multi-person conversation. The system determines the user is not engaged in the conversation. The system 100 pulses that users fitbit, i.e., haptic feedback device 51a, 51b, 51c, 51d, for a period of 3 times. Based on the lack of response, the strength and frequency of the feedback increases until he responds. The user is alerted that her attention is needed for the conversation.

FIG. 3 is a block diagram illustrating a conferencing system 100 for providing feedback to participants of multi-party phone conversations of their individual status in the conversation, in accordance with one embodiment of the present disclosure. The conferencing system 100 may be used in combination with the method described in FIG. 2. Some elements of the conferencing system 100 have already been discussed in the description of FIG. 2.

In some embodiments, the conferencing system 100 that providing feedback to participants of multi-party phone conversations includes a registration database 20 that includes a plurality of user accounts including addresses for user specific communications device 21 registered with the conference system, a user specific conduct measuring devices 22, and a user specific haptic feedback devices 23. The conferencing system 100 may also include a content input recorder 25 for receiving communications content from a communications session from content received through the user specific communications device for at least two of the users in the registration database. The conferencing system 100 may also include a conduct input recorder 25 for recording a capturing status for said at least two users from data measured by the user specific conduct measuring device.

In some embodiments, the conferencing system 100 includes an individual status calculator 35 including at least one hardware device processor 40 for performing a set of instruction stored on at least one memory device 15. The individual status calculator 35 can analyze the content of the communications session received from the user specific communications device 53a, 53b, 53c, 53d from at least two users, analyze the status of said at least two users measured by the user specific conduct measuring device 52a, 52b, 52c, 52d, and calculate whether an individual status for one of said at least two users calls for an input through said user specific communications device 53a, 53b, 53c, 53d by the user having the individual status calling for the input.

In some embodiments, the conferencing system 100 also includes a feedback signal transmitter 36 that sends a signal for input from the user. The signal is sent to the user's specific haptic feedback device 51a, 51b, 51c, 51d. The user specific haptic feedback device 51a, 51b, 51c, 51d delivers the feedback signal to the user by the physical interaction provided by the user specific haptic feedback device 51a, 51b, 51c, 51d. It is noted that each of the aforementioned elements of the conferencing system 100 are operatively coupled via a system bus 102.

Figure 4:
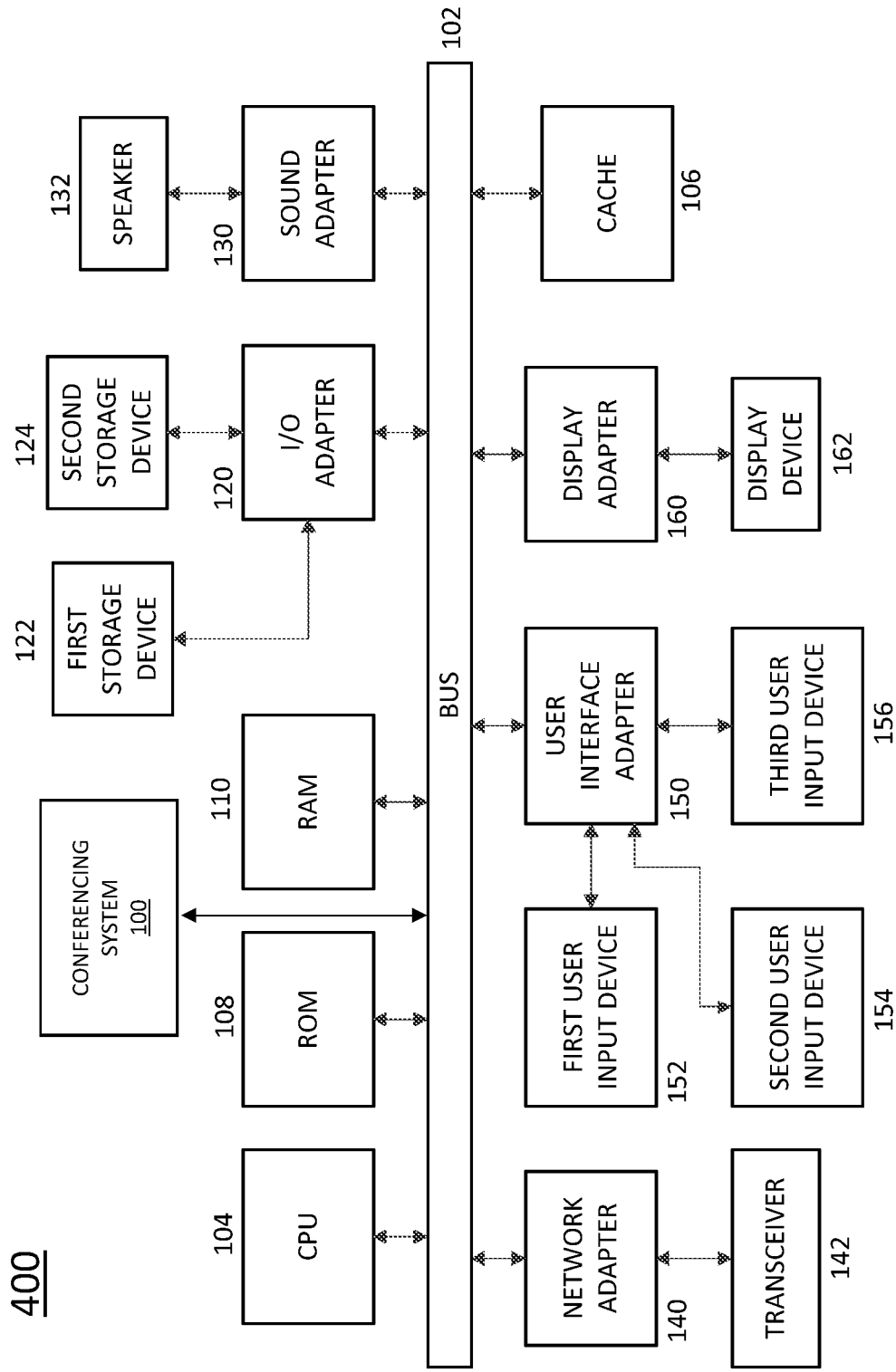
FIG. 4 is a block diagram illustrating a system that can incorporate the conferencing system depicted in FIG. 3 for providing feedback to participants of multi-party phone conversations of their individual status in the conversation, in accordance with one embodiment of the present disclosure.

The conferencing system 100 may be integrated into the processing system 400 depicted in FIG. 4. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for providing feedback to participants of multi-party phone conversations. The method actuated by the computer program product may include providing haptic feedback to participants of multi-party phone conversations that includes opening a communications session with a conference system for at least two users, wherein each of the at least two users has a user specific communications device registered with the conference system, a user specific conduct measuring device registered with the conference system, and a user specific haptic feedback device registered with the conference system. Analyzing content of the communications session from content received by the conference system through the user specific communications device for at least one of the users; and capturing status for said at least two users from data measured by the user specific conduct measuring device for the at least two users. The method may further include determining with the conference system if the content of the communications session and the status of said at least two users calls for input by the user through said user specific communications device. A feedback signal is sent from the conference system to the user specific haptic feedback device of the user that the conference system has determined that the communications session has called for said input. The user specific haptic feedback device deliverers the feedback signal to the user.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
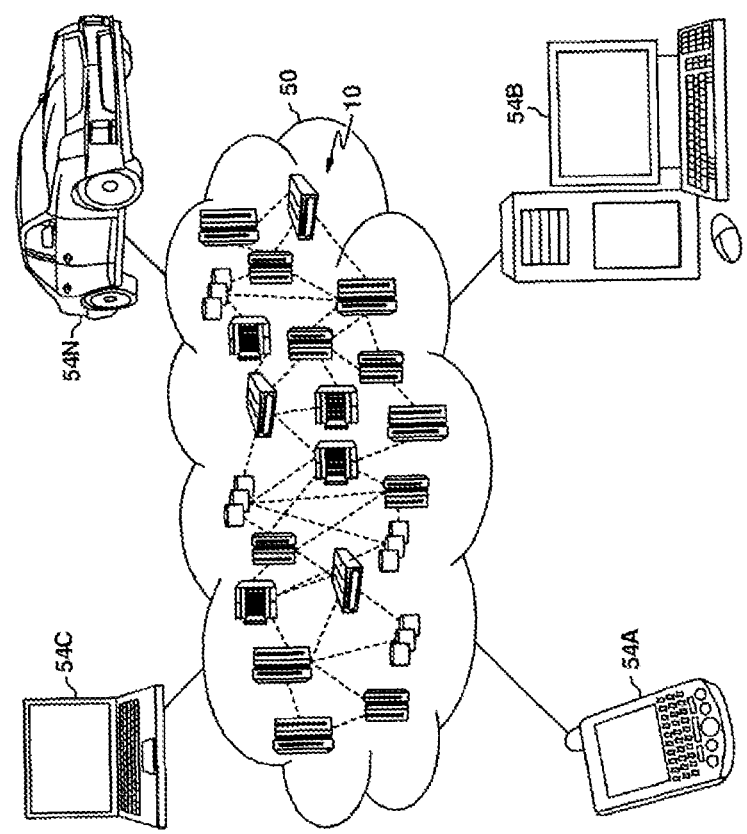
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 9:
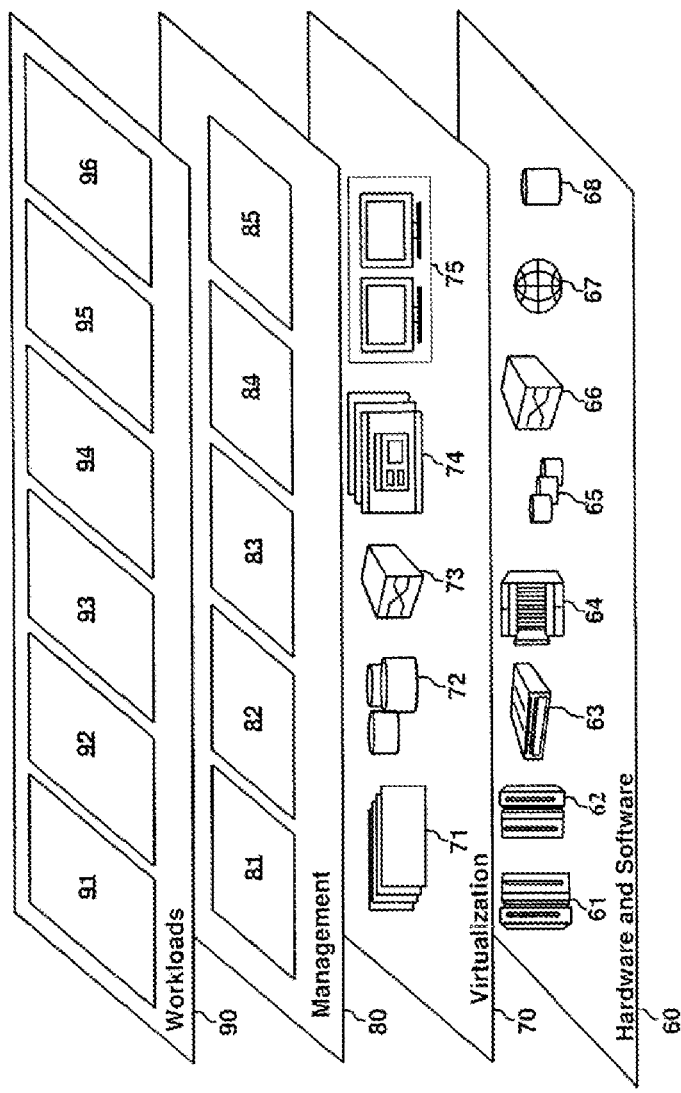
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the conferencing system 100, which is described with reference to FIGS. 1-9.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a haptic feedback to modify behavior during phone calls (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for providing haptic feedback to participants of multi-party phone conversations comprising:

opening a communications session with a conference system for a conversation between at least two users, wherein each of the at least two users has a user specific communications device registered with the conference system over which the conversation is being transmitted, a user specific conduct measuring device registered with the conference system, and a user specific haptic feedback device registered with the conference system;

capturing status for said at least two users from data measured by the user specific conduct measuring device for the at least two users, the status indicating the level of involvement of the at least two users in the conversation;

determining with the conference system if the status of said at least two users calls for input by the user to the conversation through said user specific communications device; and sending a feedback signal from the conference system to the user specific haptic feedback device of the user that the conference system has determined that the communications session has called for said input, the user specific haptic feedback device delivering the feedback signal to the user.

2. The computer implemented method of claim 1, wherein the specific communications device includes a telephone with a mute function.

3. The computer implemented method of claim 1, wherein the specific conduct measuring device includes an internet of things (IOT) device including at least one of a camera and a microphone.

4. The computer implemented method of claim 1, wherein the specific conduct measuring device includes a voice assistant.

5. The computer implemented method of claim 1, wherein the user specific haptic feedback device asserts a signal by physical interaction with the user.

6. The computer implemented method of claim 5, wherein said signal by physical interaction is selected from the group consisting of signal by an electric motor, signal by an electro-magnetic actuator, a linear resonant actuator signal, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") and combinations thereof.

7. The computer implemented method of claim 6, wherein the specific haptic feedback device has a form factor to be worn on a wrist of the user.

8. The computer implemented method of claim 7, wherein the measuring of the volume comprises determining for said participants whether a said user specific communication device is on mute.

9. The computer implemented method of claim 7, wherein capturing status for said at least two users from data measured by the user specific conduct measuring device for the at least two users comprises determining with the camera of the user specific conduct measuring device a direction of users while talking with respect to the user specific communication device, determining a distance of users while talking with respect to the user specific communication device, determining whether user is speaking with another party directly while the multi-party phone conversation is pending or a combination thereof.

10. The computer implemented method of claim 2, wherein said determining with the conference system if the content of the communications session and the status of said at least two users calls for input by the user through said user specific communications device comprises determining that the user is attempting to contribute to the multi-party phone conversation by speaking into the user specific communication device while it is set on said mute.

11. The computer implemented method of claim 1, wherein said determining with the conference system if the status of said at least two users calls for input by the user through said user specific communications device comprises determining that the communications session includes the name of an individual user, determining the individual user is not facing said user specific communications device with the user specific conduct measuring device, and issuing said calls for input by the user.

12. The computer implemented method of claim 2, wherein said determining with the conference system if the status of said at least two users calls for input by the user through said user specific communications device comprises determining that the communications session includes background noise not relevant to the multi-party conversation being measured from the user specific communications device, determining the specific communications device is not muted; and issuing said calls for input to the user corresponding to the specific communications device.

13. The computer implemented method of claim 12, wherein the back ground noise can be conversation with a user and an person that is not a party to the communications session.

14. A system for providing feedback to participants of multi-party phone conversations comprising:
a registration database that includes a plurality of user accounts including addresses for user specific communications device registered with the conference system, a user specific conduct measuring devices, and a user specific haptic feedback devices;
a content input recorder for receiving communications content from a communications session for a conversation between at least two users from content received through the user specific communications device for at least two of the users in the registration database;
a conduct input recorder for recording a status for said at least two users from data measured by the user specific conduct measuring device, the status indicating the level of involvement of the at least two users in the conversation;
an individual status calculator including at least one hardware device processor for performing a set of instruction stored on at least one memory device working in combination with an artificial neural network providing device, the individual status calculator analyzing the status of said at least two users measured by the user specific conduct measuring device signals, and calculating whether an individual status for one of said at least two users calls for an input through said user specific communications device by said user having the individual status calling for said input; and
a feedback signal transmitter that sends a signal for input through said user specific communications device to a user having the individual status calling for said input, the user specific haptic feedback device delivering the feedback signal to the user having the individual status calling for said input.

15. The system of claim 14, wherein the specific communications device includes a telephone with a mute function, and wherein the specific conduct measuring device is an internet of things (IOT) device including at least one of a camera and a microphone.

16. The system of claim 14, wherein the user specific haptic feedback device asserts a signal by physical interaction with the user by an electric motor, an electro-magnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof.

17. A computer program product comprising a non-transitory computer readable storage medium having computer readable program code embodied therein for providing haptic feedback to participants of multi-party phone conversations, the method comprising:
opening a communications session with a conference system for a conversation between at least two users, wherein each of the at least two users has a user specific communications device registered with the conference system over which the conversation is being transmitted, a user specific conduct measuring device registered with the conference system, and a user specific haptic feedback device registered with the conference system;

capturing status for said at least two users from data measured by the user specific conduct measuring device for the at least two users, the status indicating the level of involvement of the at least two users in the conversation;

determining with the conference system if the content of the communications session and the status of said at least two users calls for input by the user to the conversation through said user specific communications device; and sending a feedback signal from the conference system to the user specific haptic feedback device of the user that the conference system has determined that the communications session has called for said input, the user specific haptic feedback device delivering the feedback signal to the user.

18. The computer program product of claim 17, wherein the specific communications device includes a telephone with a mute function.

19. The computer program product of claim 17, wherein the specific conduct measuring device includes an internet of things (IOT) device including at least one of a camera and a microphone.

20. The computer program product of claim 18, wherein capturing status for said at least two users from data measured by the user specific conduct measuring device for the at least two users comprises determining with the camera of the user specific conduct measuring device a direction of users while talking with respect to the user specific communication device, determining a distance of users while talking with respect to the user specific communication device, determining whether user is speaking with another party directly while the multi-party phone conversation is pending or a combination thereof.

* * * * *